United States Patent
Shamsunder

(10) Patent No.: US 7,672,409 B2
(45) Date of Patent: Mar. 2, 2010

(54) BASE STATION SOFTWARE FOR MULTI-USER DETECTION UPLINKS AND DOWNLINKS AND METHOD THEREOF

(75) Inventor: Sanyogita Shamsunder, Basking Ridge, NJ (US)

(73) Assignee: Sandbridge Technologies, Inc., White Plains, NY (US)

( * ) Notice: Subject to any disclaimer, the term of this patent is extended or adjusted under 35 U.S.C. 154(b) by 1200 days.

(21) Appl. No.: 11/181,700

(22) Filed: Jul. 15, 2005

(65) Prior Publication Data

US 2006/0018398 A1     Jan. 26, 2006

Related U.S. Application Data

(60) Provisional application No. 60/590,439, filed on Jul. 23, 2004.

(51) Int. Cl.
     *H04B 1/02* (2006.01)
(52) U.S. Cl. .................. 375/347; 712/221; 712/215; 712/32; 370/204; 370/210; 375/324; 375/232
(58) Field of Classification Search ............. 375/267, 375/340, 347, 260, 324, 142, 143, 150, 232, 375/233, 231, 343; 712/4, 22, 32, 35, 215, 712/1, 2, 203, 221; 370/204, 210, 211, 468, 370/473, 497, 471
See application file for complete search history.

(56) References Cited

U.S. PATENT DOCUMENTS

| | | | | |
|---|---|---|---|---|
| 5,212,777 | A | * | 5/1993 | Gove et al. .................. 712/229 |
| 5,371,896 | A | * | 12/1994 | Gove et al. .................. 712/20 |
| 5,522,083 | A | * | 5/1996 | Gove et al. .................. 712/22 |
| 5,809,288 | A | * | 9/1998 | Balmer .................... 713/375 |
| 6,636,561 | B1 | * | 10/2003 | Hudson .................... 375/232 |
| 2003/0120901 | A1 | * | 6/2003 | Hokenek et al. ............ 712/215 |
| 2004/0068730 | A1 | * | 4/2004 | Miller et al. .............. 718/106 |

OTHER PUBLICATIONS

Vollmer, M. et al.,"comparative study of joint-detection techniques for TD-CDMA based mobile radio systems", Dec. 15, 2000 (revised Apr. 24, 2001), IEEE journal on selected areas in communications, pp. 1-31.*

Anderson, N. W. et al."sofware-definable implementation of a TDMA/CDMA transceiver",1998, Proc. of ICSPAT.*

Glossner, et al., "Multiple Communication Protocols for Software Defined Radio" *IEE Colloquium on DSP Enable Radio*, pp. 227-236, Sep. 22-23, 2003, ISIL, Livingston, Scotland.

(Continued)

*Primary Examiner*—David C Payne
*Assistant Examiner*—Rahel Guarino

(57) ABSTRACT

A method of multi-user detection in a given uplink and downlink time slot in a software-defined receiver which includes filtering and sampling a received signal; forming a block-banded matrix A of the sampled signals; and solving $\hat{d}=T^{-1}y$, where $T=(A^H A)$, $y=A^H x$. The methods of solving for the matrix T includes a) computing Cholesky factors of the matrix T by approximating using the block-banded property of the matrix T and A; b) Schur decomposition for Cholesky factors of the matrix T and approximating the lower triangular Cholesky factor matrix R using block Toeplitz property of matrix T; or c) Fourier Transformation.

2 Claims, 14 Drawing Sheets

OTHER PUBLICATIONS

Vollmer, M., et al., "Comparative Study of Joint-Detection Techniques for TD-CDMA Based Mobile Radio Systems," *IEEE Journal on Selected Areas in Communications* (Revised), Dec. 15, 2000; rev. Apr. 24, 2001.

Klein, a., et al., "Zero Forcing and Minimum Mean-Square-Error Equalization for Multiuser Detection in Code-Division Multiple-Access Channels," *IEEE Trans. on Veh. Tech.*, 45:2 May 1996.

Jinturkar, S., et al. "Programming The Sandbridge Multithreaded Processor," *Proceedings of the 2003 Global Signal Processing Expo (GSPx) and International Signal Processing Conference (ISPC)*, Mar. 31-Apr. 3, 2003, Dallas, TX.

Glossner, J., et al., "A Software Defined Communications Baseband Design" *IEEE Communications Magazine*, 41:1, pp. 120-128, Jan. 2003.

Vollmer, M., et al., "Schur Algorighms for Joint-Detection in TD-CDMA based Mobile Radio Systems," *Annals of Telecommunications*, 1999.

Anderson, N. W., et al., "Software-Definable Implementation of a TDMA/CDMA Transceiver," *Proc. of ICSPAT*, 1998.

Beretta, M., et al., "Space-Time Multiuser Detectors for TDD-URTA: Design and Optimization," *Proc. IEEE of VTC*, pp. 375-379, 2001.

Golub, G., et al., "Matrix Factorizations in Fixed Point on the C6x VLIW Architecture," TI Rport, Dec. 21, 1998.

\* cited by examiner 7 slots per 5 ms sub-frame (1.28 Mcps, low chip rate option)

BASE STATION SOFTWARE FOR MULTI-USER DETECTION UPLINKS AND DOWNLINKS AND METHOD THEREOF

CROSS REFERENCE

The present application claims the benefit of provisional U.S. application Ser. No. 60/590,439 filed Jul. 23, 2004, which is incorporated herein by reference.

BACKGROUND AND SUMMARY OF THE DISCLOSURE

TD-SCDMA belongs to the family of 3G wireless standards as defined by the 3GPP and will be deployed by many carriers in their TDD mode. The 3GPP has adopted two different chip rates for this mode, 3.84 Mcps high chip rate mode and 1.28 Mcps low chip rate version. The former is compatible with WCDMA and has frame durations of 10 ms with 15 slots. The latter has a frame duration of 5 ms with 7 slots/frame. Both versions of TD-SCDMA include sophisticated physical layer techniques such as smart antennas and joint detection to increase system capacity even with inter-chip and multi-user interference.

Because of the slotted TDMA scheme with short PN sequences and a small number of simultaneous users, multi-user detection (MUD) are now possible even in the downlink. Multi-user detection techniques for the uplink have been advocated even during the standardization process. See M. Vollmer, M. Haardt, J. Gotze, "Comparative Study of Joint-Detection Techniques for TD-CDMA Based Mobile Radio Systems," *IEEE J. Selected Areas of Communications*, pp. 1461-1475, August 2001 (Vollmer et al. I). However, the complexity of such optimal detection techniques has prevented their widespread use especially on the downlink at the mobile.

Joint or multi-user detection at the baseband tremendously improves performance over a conventional Rake receiver. The latter deteriorates in performance when multipath reduces the orthogonality of the spreading codes. However, the disadvantage is the increased receiver complexity when compared to the more conventional, though sub-optimal Rake receiver. Several block-based multi-user detection schemes are investigated. Zero-forcing and MMSE techniques based on matrix factorizations have been studied. See, e.g., "Zero-forcing and minimum-mean square error equalization for multi-user detection in code-division multiple access channels," *IEEE Trans. on Veh. Tech.*, pp. 276-287, May 1996; and Vollmer et al. I.

The present disclosure is a method of multi-user detection in a given uplink and downlink time slot in a software-defined receiver. The method includes filtering and sampling a received signal; forming a block-banded matrix A of the sampled signals; and solving $\hat{d}=T^{-1}y$, where $T=(A^H A)$, $y=A^H x$.

A first method of solving for the matrix T is by applying the inverse matrix T of the system matrix $T^1$ using a zero-forcing equalizer or decorrelating detector; and computing Cholesky factors of the matrix T by approximating using the block-banded property of the matrix T and A.

A second method is by Schur decomposition for Cholesky factors of the matrix T. The second method includes computing a generator matrix G of the matrix T; Givens rotating the matrix G to produce lower triangular Cholesky factor matrix R; and approximating matrix R using block Toeplitz property of matrix T. Also, only first couple of block columns of the matrix R are computed and the last block is copied.

A third method is by Fourier Transformation and includes padding the matrix T to make it circulant before solving.

These and other aspects of the present disclosure will become apparent from the following detailed description of the disclosure, when considered in conjunction with accompanying drawings.

DETAILED DESCRIPTION OF THE PREFERRED EMBODIMENTS

TD-SCDMA System and Signal Model

Figure 1:
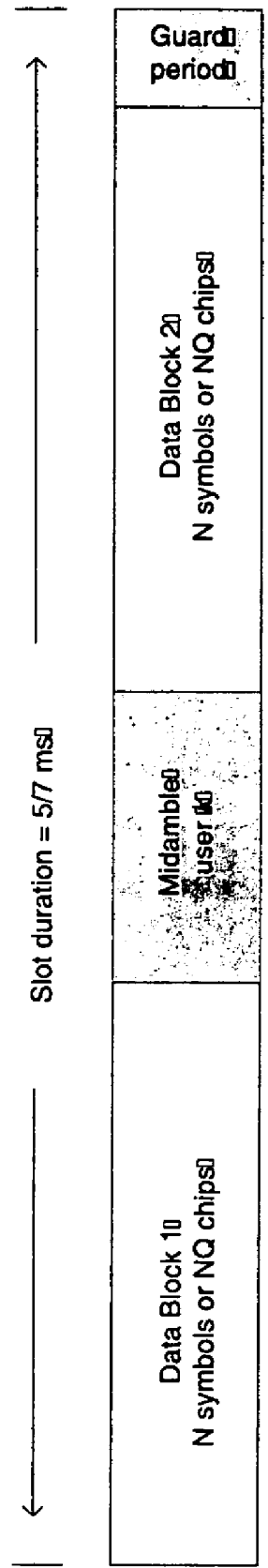
FIG. 1 shows the structure of a time slot.

The TD-SCDMA system as defined in the 3GPP standard combines aspects of TDMA with CDMA. It allows for the existence of multiple users, in a given uplink or downlink time-slot. Further, the timeslots can be for either uplink or downlink transmission. The structure of a time-slot is shown in FIG. 1. In the low chip rate mode, TD-SCDMA defines 7 slots with the first slot reserved for downlink. The 7 slot subframe lasts 5 ms and had multiple switching point for reversing the direction of transmission. Each user data vector is spread and the composite downlink data vector is scrambled using a scrambling code of length 16. A downlink burst consists of two data blocks with a user-specific midamble that is used for various tasks by the receiver. There is also a guard interval between neighbouring bursts. Based on the supported data rates, the modulation can be QPSK, 8PSK or 16QAM.

Let K be the number of synchronous downlink or spreading codes in a time-slot. A user can have multiple codes assigned to it. The data blocks consist of scrambled and spread symbols. Let N be the number of symbols/block and $1 \leq Q \leq 16$ be the spreading factor. It is assumed that there is only 1 receive antenna at the mobile device. Let $c_k$, $d_k(i)$ and $Q_k$ be the spreading code, data symbols and the spreading factor for the kth, respectively. Then, the discrete time signal transmitted by the base station in TD-SCDMA is $$y(n) = z(n) \sum_{k=1}^{K} \left[ \sum_i d_k(i) c_k(n - iQ_k) \right], \quad (1)$$

where $z(n)$ is the base-station specific scrambling code. $z(n)$ will be dropped in the remainder of this application because it is not relevant to the algorithm performance. Let h be the downlink channel, impulse response with duration W chips. The filtered and sampled signal at the receiver is:

$$x = Ad + v. \quad (2)$$

Figure 2:
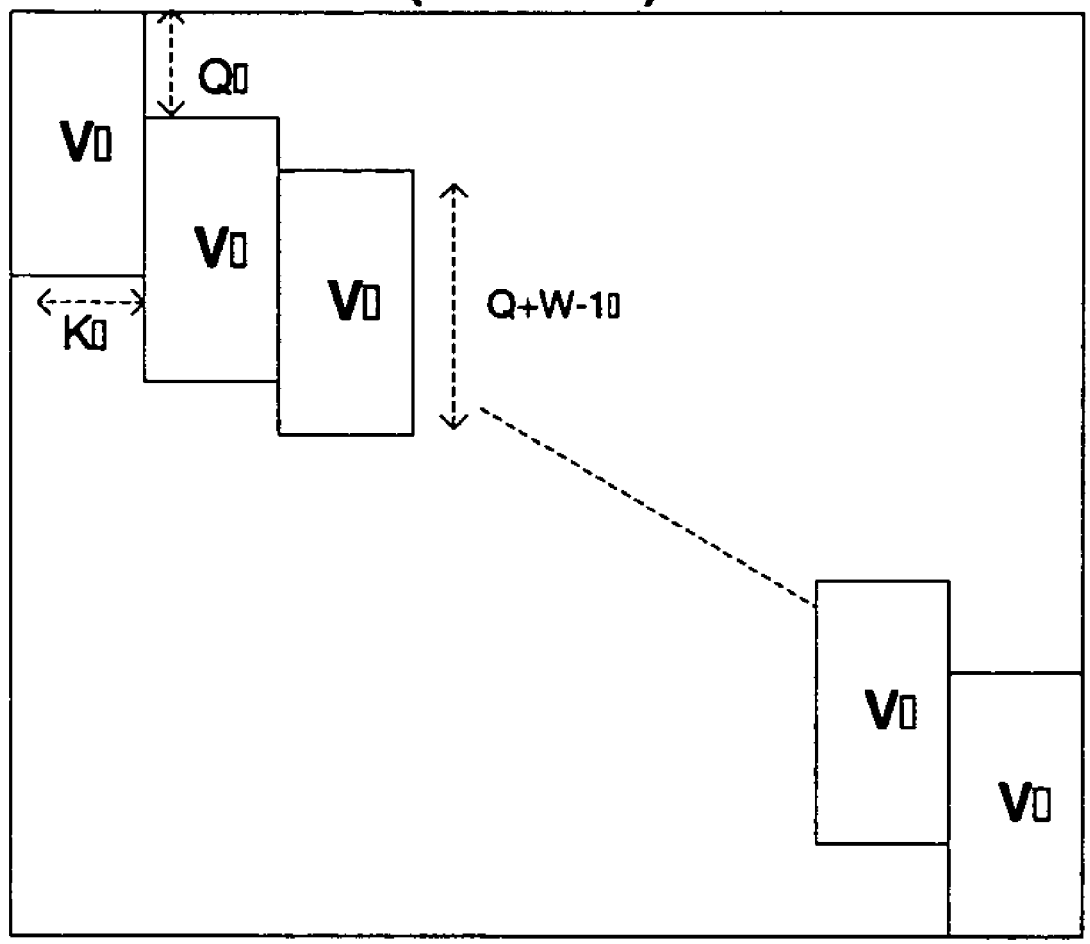
FIG. 2 shows the block-banded A of the filtered and sample receiver signal of x=Ad+v and the system matrix A with columns $b_k = h_k \times c_k$.
Figure 2:
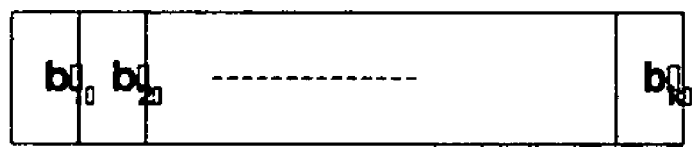
Figure 3:
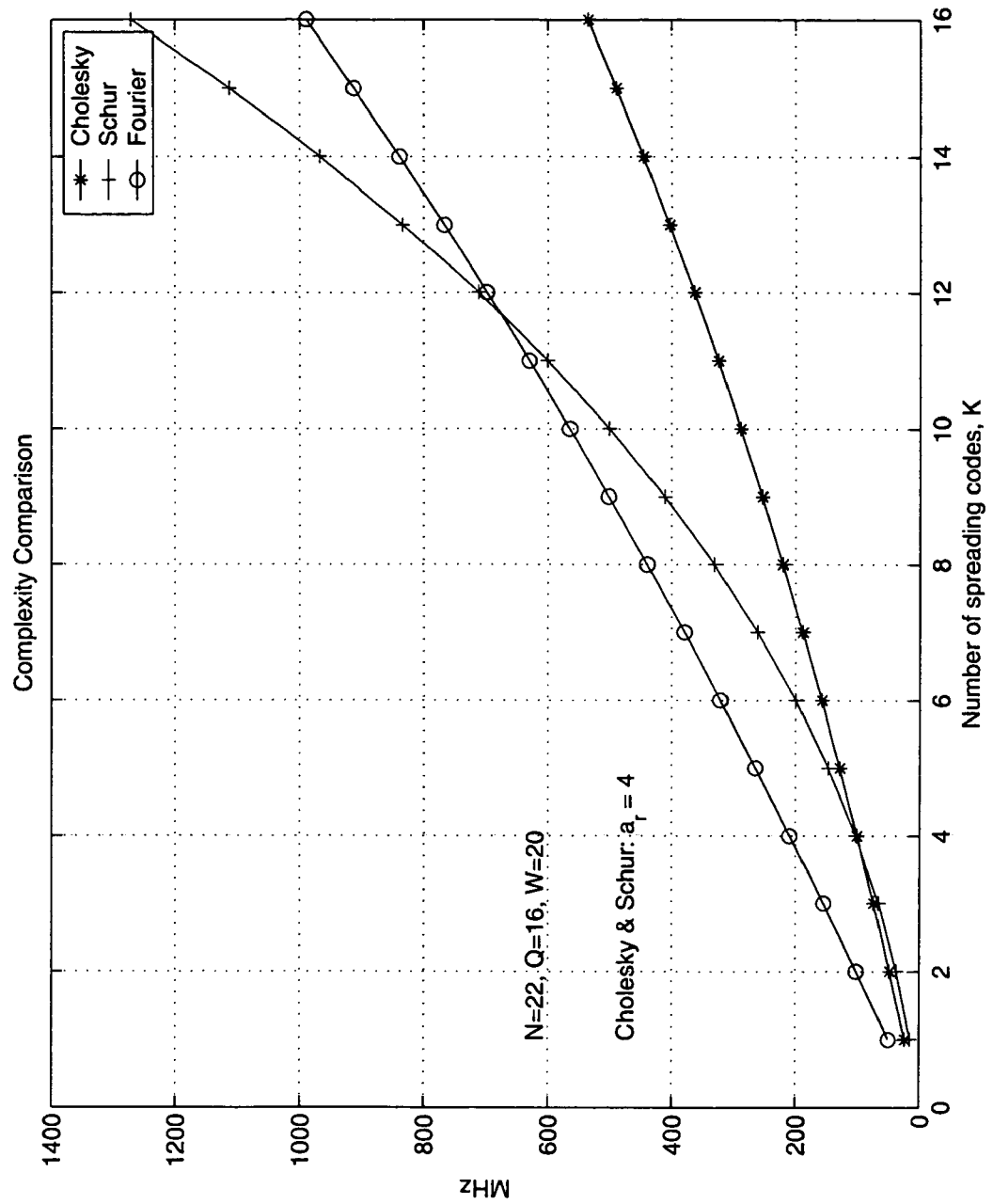
FIG. 3 shows power graphs of frequency v. spreading codes K where N=22.
Figure 4:
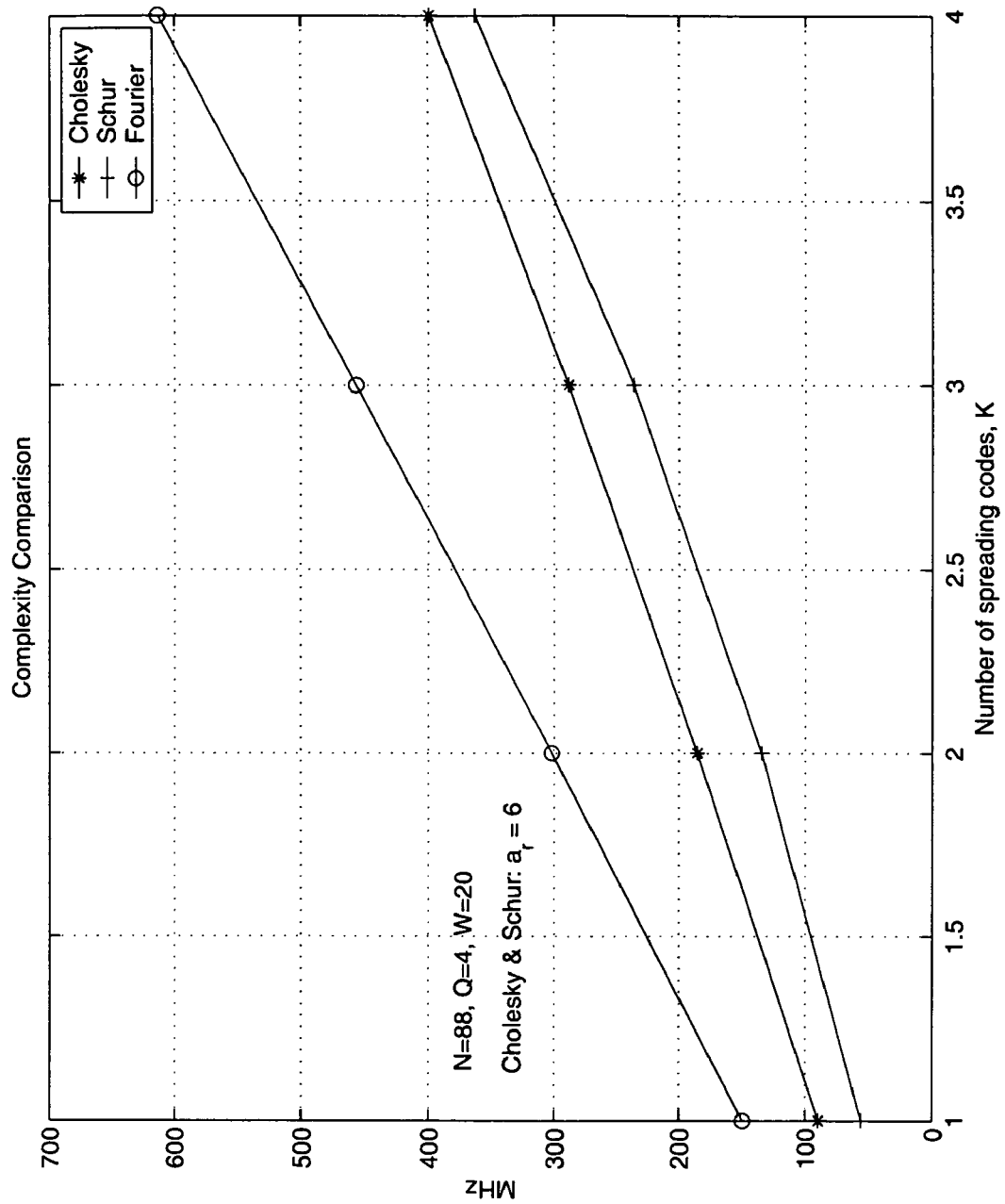
FIG. 4 shows power graphs of frequency v. spreading codes K where N=88.
Figure 5:
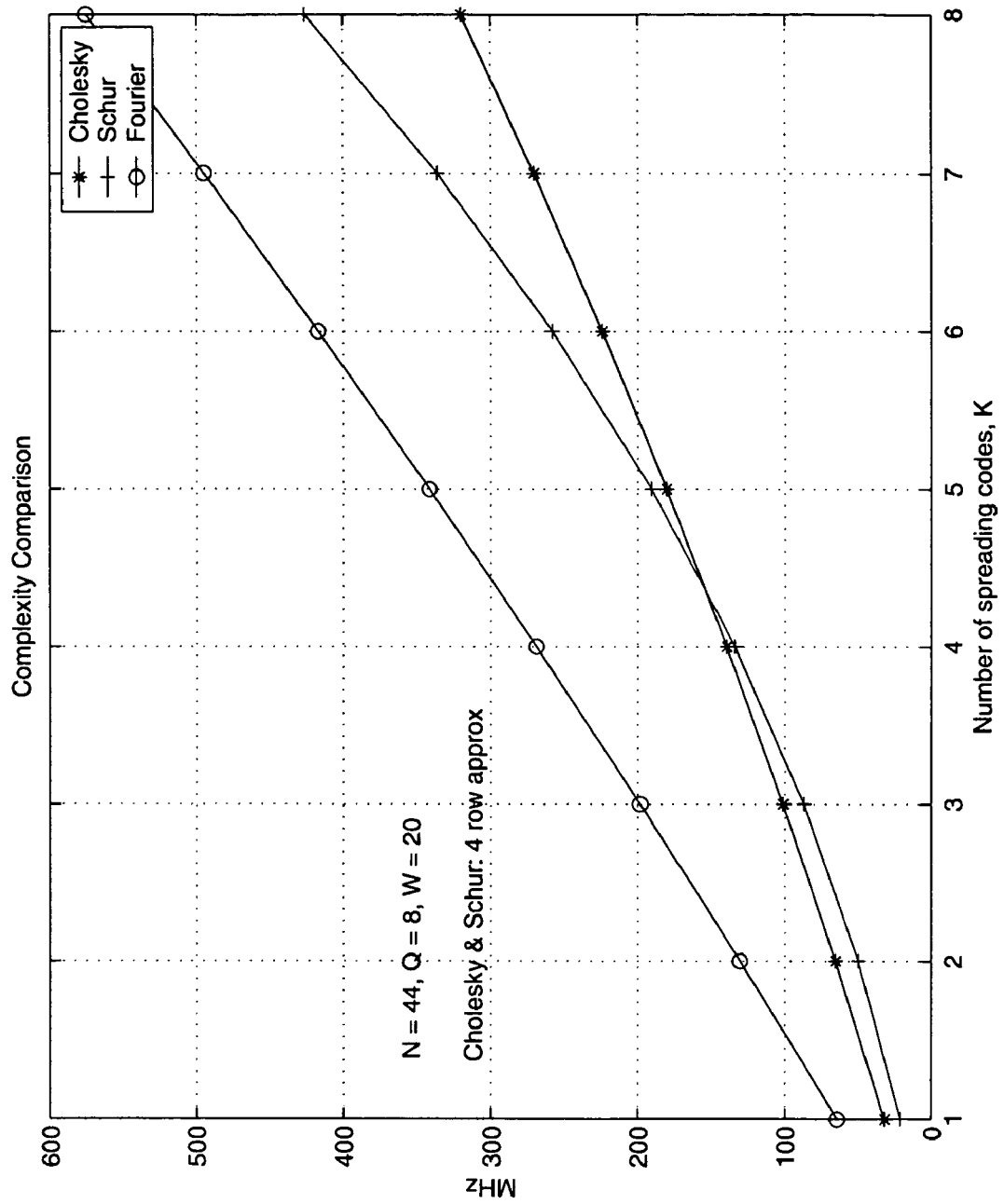
FIG. 5 shows power graphs of frequency v. spreading codes K where N=22.
Figure 6:
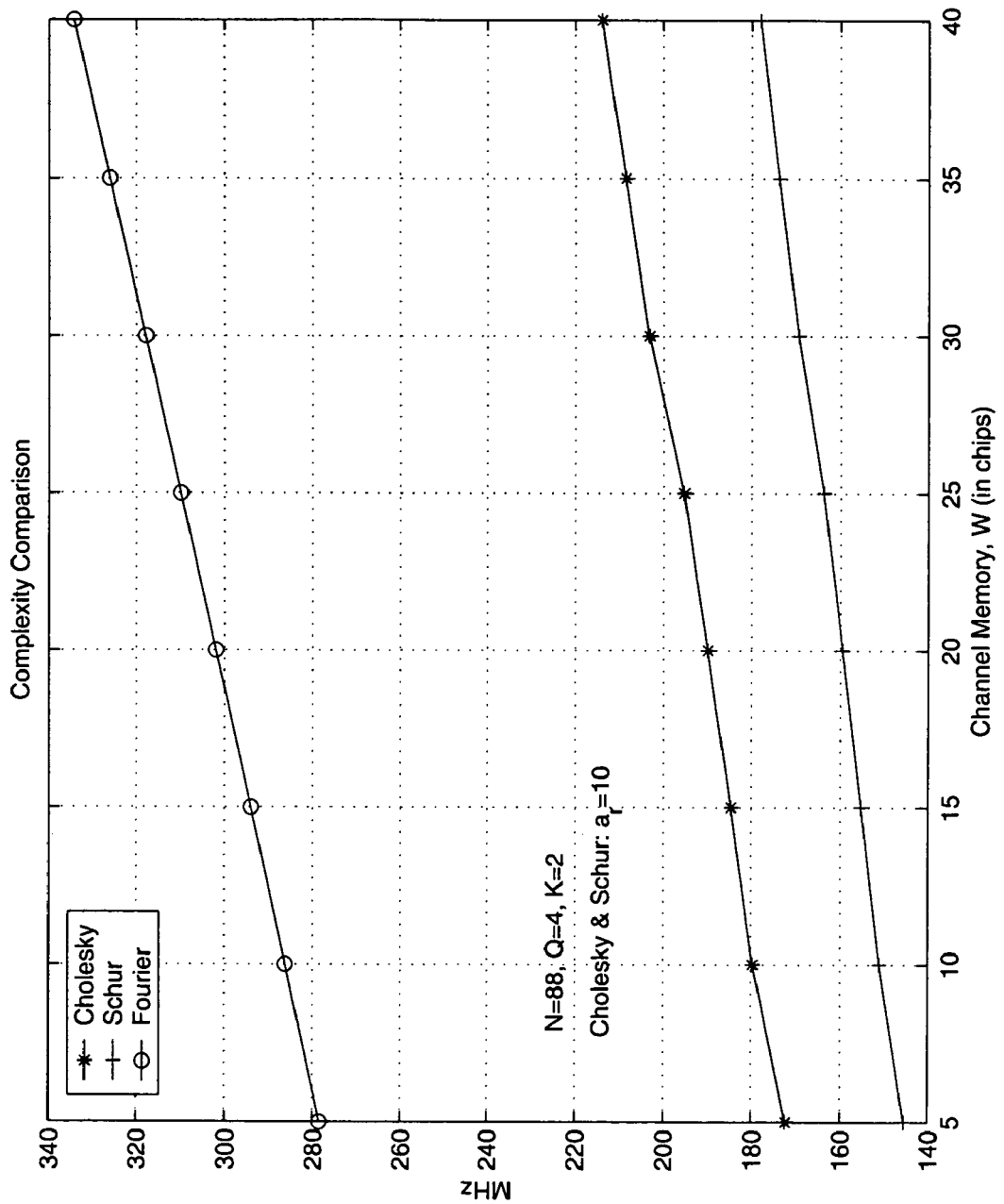
FIG. 6 shows power graphs of frequency v. channel memory W where N=88.
Figure 7:
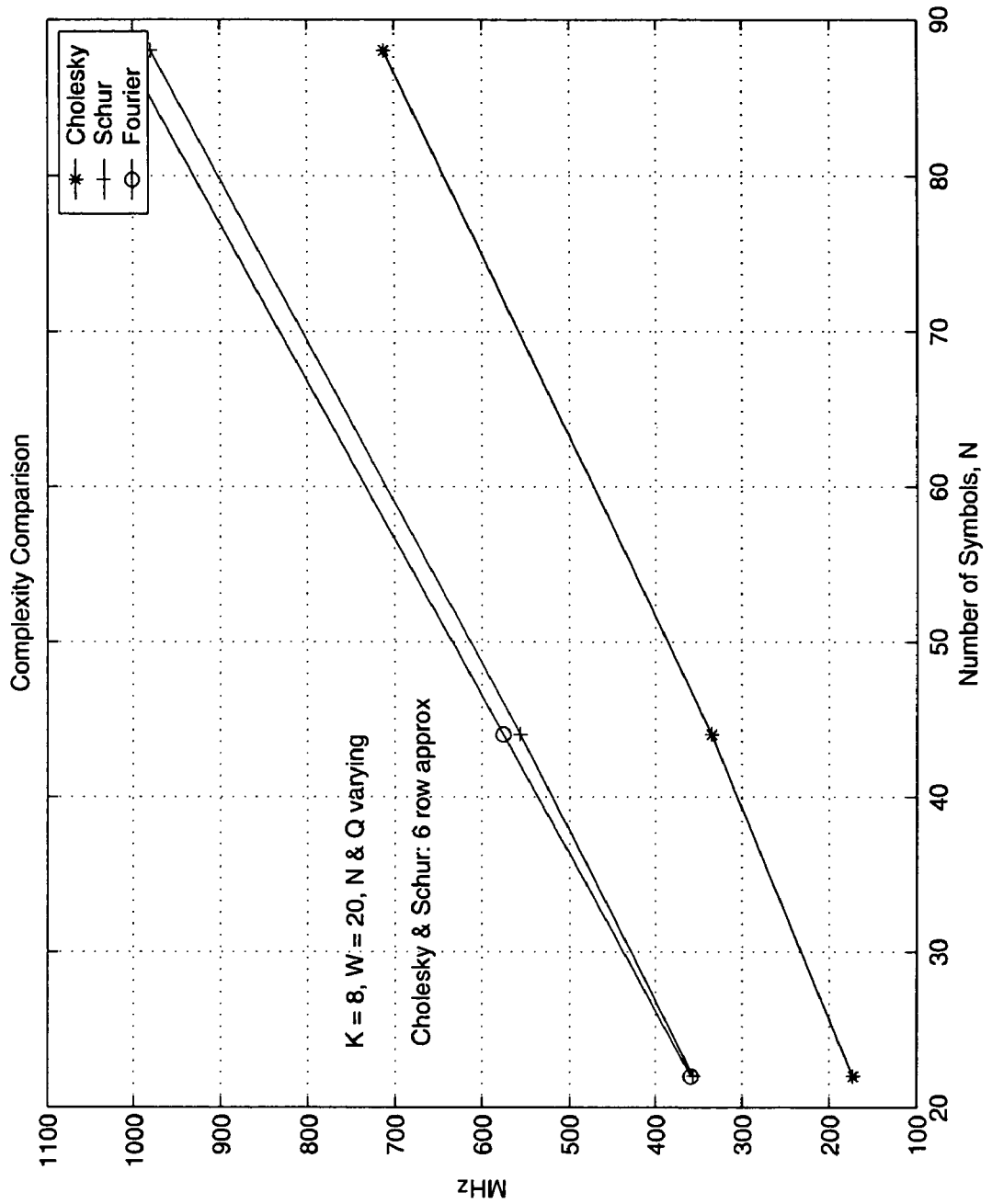
FIG. 7 shows power graphs of frequency v. number symbols N with the number of parallel users K=8.
Figure 8:
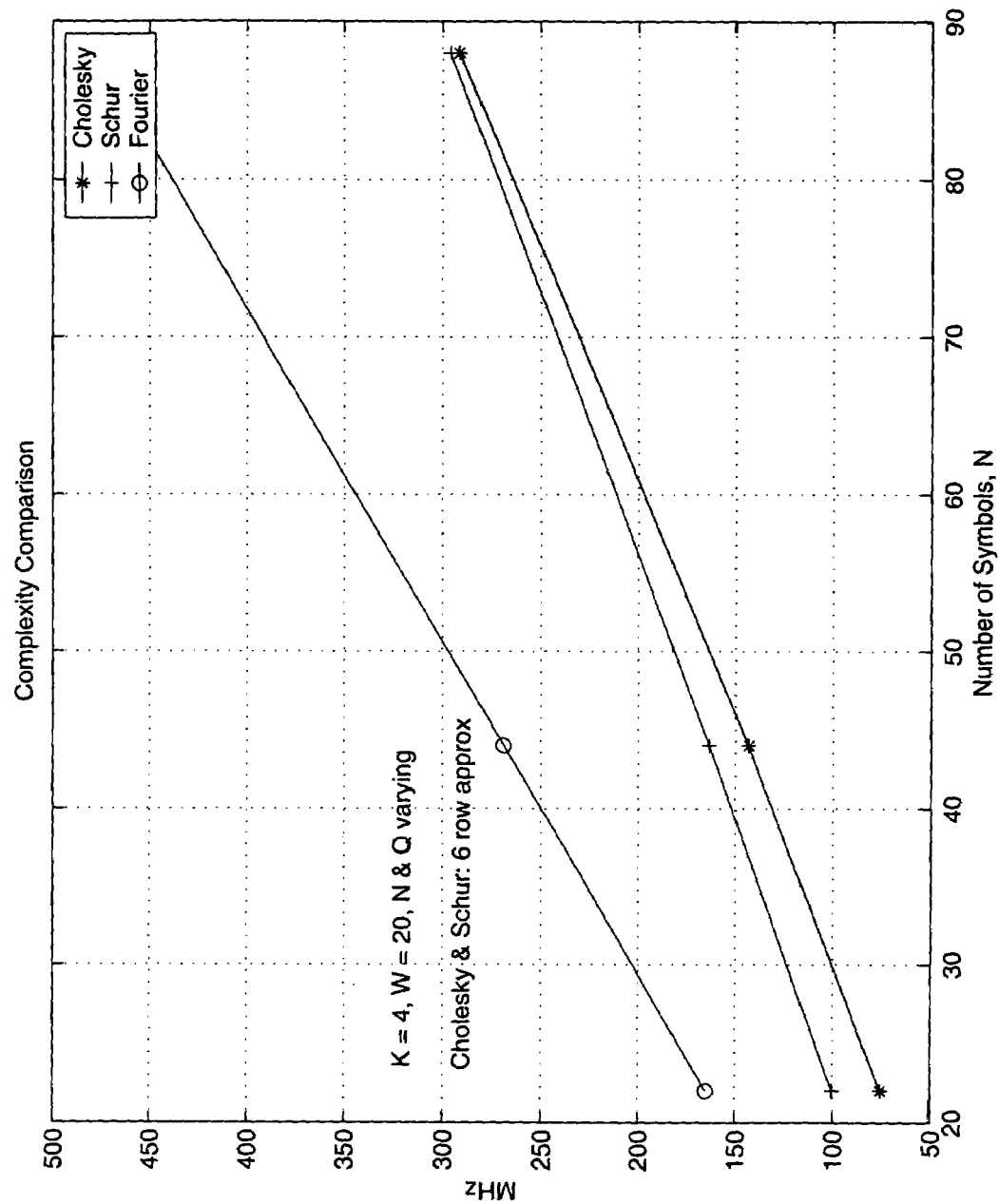
FIG. 8 shows power graphs of frequency v. number symbols N with the number of parallel users K=4.
Figure 9:
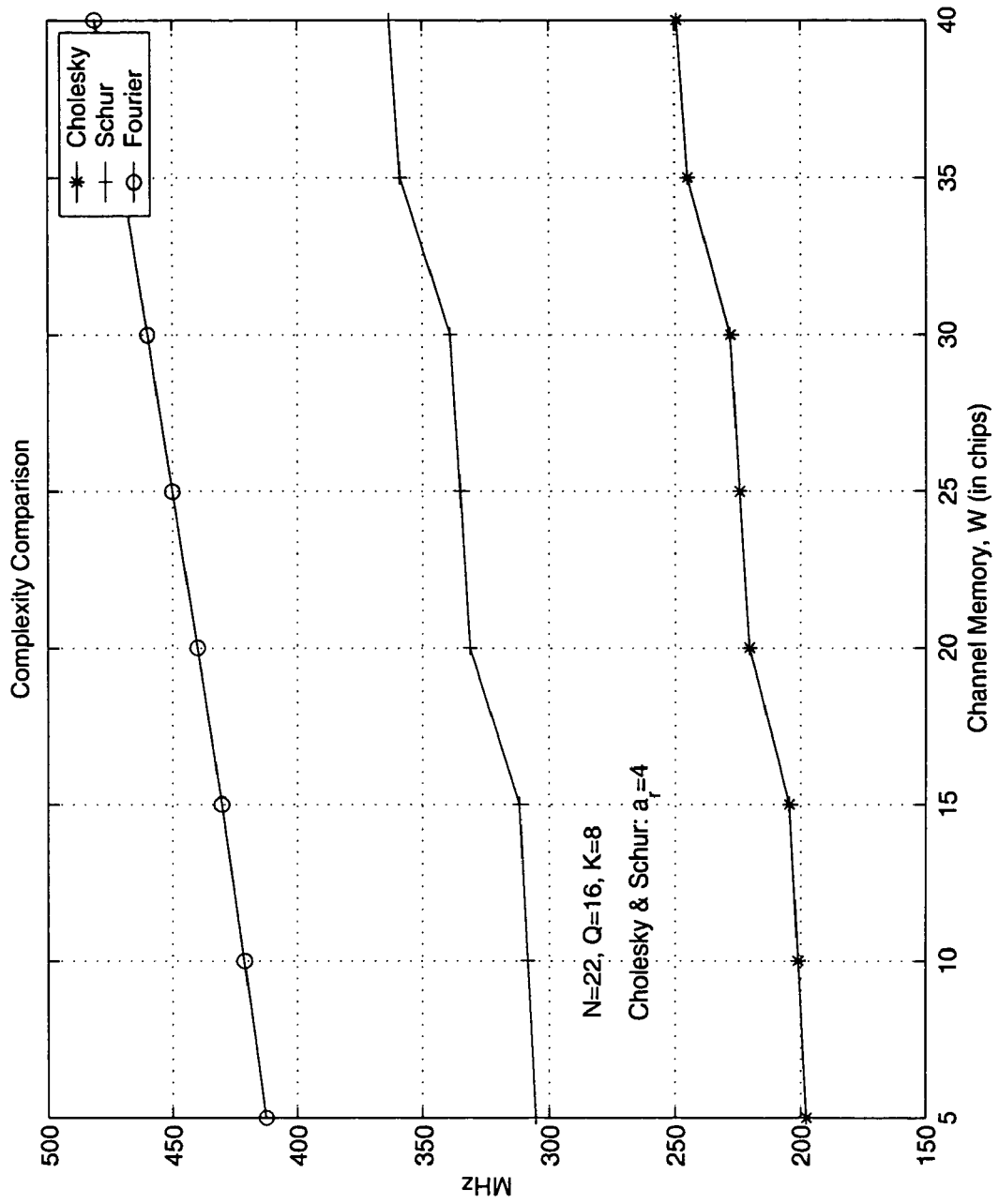
FIG. 9 shows power graphs of frequency v. channel memory where N=22, and $a_r=4$.
Figure 10:
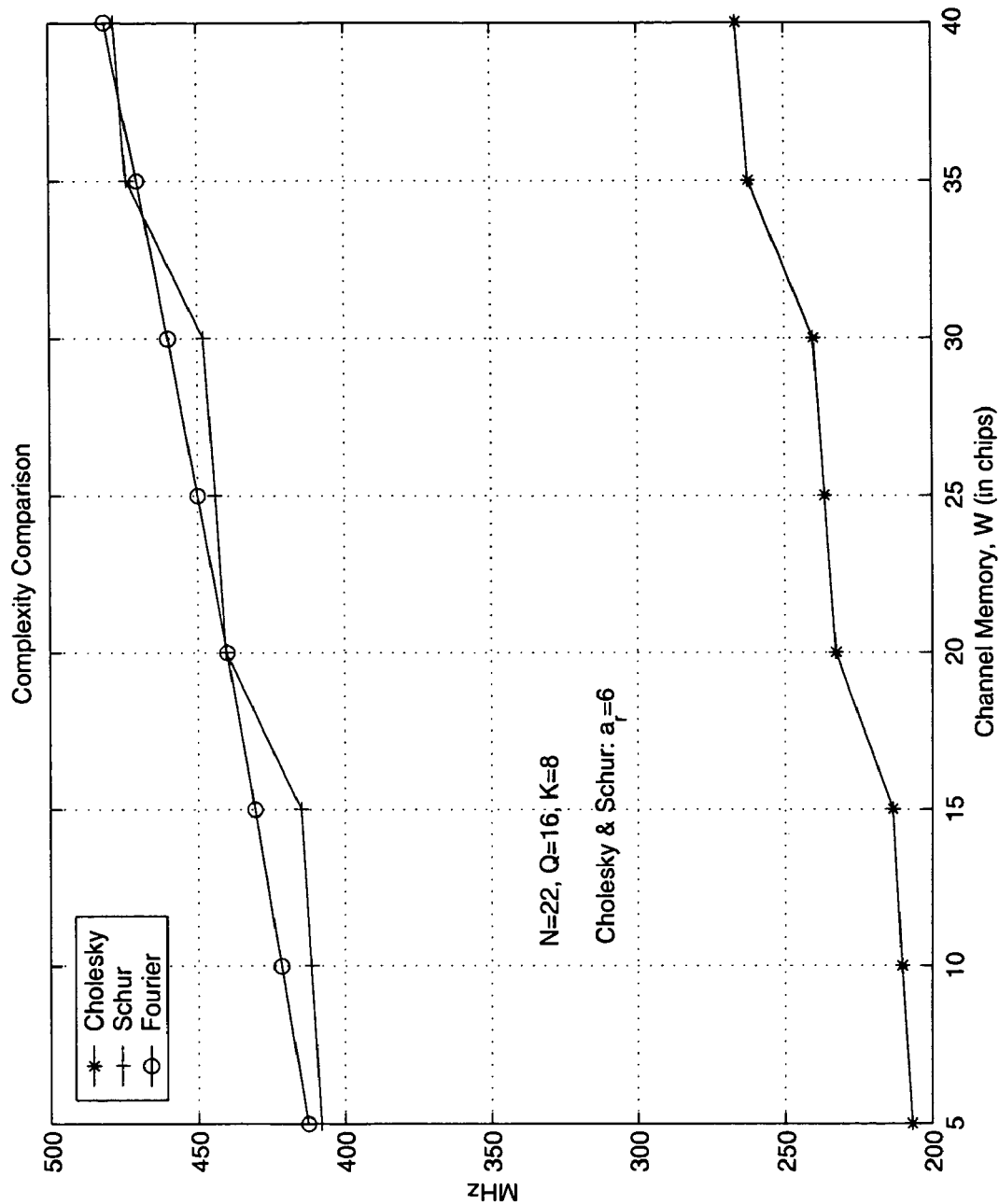
FIG. 10 shows the relationship of FIG. 10 with $a_r=6$.

The vector x denotes the received chips (1 sample/chip) in a slot and the columns of (NQ+W−1)×NK sized matrix A are the convolution of h and $c_k$. See, e.g., M. Vollmer, M. Haardt, J. Gotze, "Schur Algorithms for joint-detection in TD-CDMA based mobile radio systems," *Annals of Telecommunications*, pp. 365-378, 1999.(Vollmer et al. II) The block-banded A is as shown in FIG. 2. The noise vector v is approximately additive, white Gaussian (AWGN) and includes interference. In a typical TD-SCDMA deployment, for the downlink K≦8, Q∈{1, 2, 4, 8, 16}, 2N=704/Q and W≈20.

Without loss of generality, let $d_1(t)$ be the desired user symbols. A receiver matched to this user treats the interfering user signals as additive noise and extracts the desired signal based on the user-specific spreading or channelization code. Therefore, a Rake receiver, which is based on the matched-filter bank concept, is susceptible to near-far effects and deteriorates in performance when stronger undesired users are present. However, due to its simplicity, this is the method of choice in most downlink receivers for cellular CDMA.

On the other hand, a joint-detector exploits the structure of the interfering signals to jointly estimate all the user signals d. Multi-user detectors (MUD) are near-far resistant but are not practical for most of the cellular CDMA receivers. However, the time-slotted nature of TD-SCDMA enables the use of MUDs at the base-station side. Several sub-optimal and computationally efficient techniques for inverting the system matrix A have been proposed. See N. W. Anderson, H. R. Karimi, and P. Mangold, "Software-Definable Implementation of a TDMA/CDMA Transceiver," *Proc. of ICSPAT*, 1998 (Anderson et al.) and Vollmer et al. I. The resulting algorithms are amenable to hardware/software implementation at the base-station where complexity and power constraints are not critical; they are still considered complex for use at the handset. The prototype built during the standardization process was an software-defined radio based solution. However, most commercial applications have considered hardware implementations for complex receiver blocks.

Traditional communications systems have typically been implemented using custom hardware solutions. Chip rate, symbol rate, and bit rate co-processors are often coordinated by programmable DSPs, but the DSP processor does not typically participate in computationally intensive tasks. As it typically happens in a modern day receiver, when multiple systems requirements are considered, both silicon area and design validation are major inhibitors to commercial success. A software-based platform capable of dynamically reconfiguring communications systems enables elegant reuse of silicon area and dramatically reduces time to market through software modifications instead of time consuming hardware redesigns. SDR solutions based on the SandBlaster® platform have been proposed for WCDMA, 802.11 and other wireless baseband receivers. See J. Glossner, D. Iancu, J. Lu, E. Hokenek, and M. Moudgill, "Software Defined Communications Baseband Design," *IEEE Communications Magazine*, vol. 41, no. 1, pp. 120-128, January 2003 (Glossner et al. I) and J. Glossner, D. Iancu, G. Nacer, S. Stanley, E. Hokenek, and M. Moudgill, "Multiple Communication Protocols for Software Defined Radio," *IEE Colloquium on DSP Enable Radio*, pp. 227-236, Sep. 22-23, 2003, ISIL, Livingston, Scotland (Glossner et al. I).

This disclosure examines three different reduced complexity techniques that have been proposed for joint detection and will consider their suitability for implementation on a fixed-point, multi-threaded SandBlaster® platform. See S. Jinturkar, J. Glossner, E. Hokenek, and M. Moudgill, "Programming the Sandbridge Multithreaded Processor," *Proceedings of the 2003 Global Signal Processing Expo (GSPx) and International Signal Processing Conference (ISPC)*, Mar. 31-Apr. 3, 2003, Dallas, Tex. (Jinturkar et al). The algorithms are briefly described below, and the software implementation is also addressed.

Multi-User Detection Algorithms

The matrix A can be easily computed based on estimates of the channel coefficients and spreading codes. The Maximum Likelihood solution for equation (2) involves searching for data symbols d over a multi-dimensional space and is thus impractical. The sub-optimal least-squares estimate of the NK data symbols is given by:

$$\hat{d} = T^{-1} y, \text{ where } T = (A^H A), y = A^H x. \quad (3)$$

There are a number of approaches for implementing joint detection in a CDMA system. The zero-forcing (ZF) equalizer or decorrelating detector applies the inverse of the system matrix to separate the user signals and eliminate multi-access interference (MAI). This scheme is very popular and was considered for the early TD-SCDMA demos, as indicated at "Zero-forcing and minimum-mean square error equalization for multi-user detection in code-division multiple access channels," *IEEE Trans. on Veh. Tech.*, pp. 276-287, May 1996. A Minimum-Mean Square Error (MMSE) detector minimizes the error between the weighted received signal and the desired bits and can result in lower BER at high SNR levels. The computational costs of the ZF equalizer are smaller than that for the MMSE detector because the latter requires an estimate of the noise covariance matrix; however, the implementation issues are very similar. This disclosure only addresses the zero-forcing detector.

From equation (3), the NK×NK matrix $T = A^H A$ is Hermitian. The matrices A and T are block diagonal with 2v −1, v=[Q+W−1)/Q]−1 non-zero diagonal blocks. Direct computation of the Cholesky factors of matrix T requires $O(N^3 K^3)$ operations, as referred to in G. H. Golub and C. F. VanLoan, *Matrix Computations*, The Johns Hopkins University Press, 1991, (Golub et al. I), which is infeasible for a typical TD-SCDMA handset. The computations can be reduced by a factor of $N^2$ by exploiting the block-banded property of matrix T. Additional details on complexity reduction for this approach can be found in Anderson et al.; and M. Beretta, A. Colamonico, M. Nicoli, V. Rampa, U. Spagnolini, "Space-Time multi-user detectors for TDD-UTRA: design and optimization," *Proc. IEEE of VTC*, pp. 375-379, 2001 (Beretta et al.)

Complexity of Schur Decomposition

Since matrix T is sparse and block Toeplitz, its' Schur decomposition is an efficient way to Cholesky factorization. By working with a low redundancy representation based on the generators of matrix T rather than matrix T, the algorithm reduces the number of required operations.

Note that each of the NK elements of the generator vectors $a_i$, $1 \leq i \leq K$, requires one square-root and a reciprocal. Thus there are a total of $NK^2$ such operation, each requiring multiple MACs.

Once the generator matrix G of size 2LNK×NK is computed, the lower triangular Cholesky factor matrix R of matrix T is obtained by successive application of Givens rotations.

As each row operation is performed, the matrix G shrinks progressively as the lower triangular matrix R is built. For each i, only the first step requires computations. For elimination of the non-zero elements, Givens rotation is recommended especially for fixed-point implementation. However, this step requires several scalar reciprocals and square-root operations which can cost multiple cycles in a typical DSP implementation.

The complexity can be further reduced by exploiting the fact that as N–>∞, the Cholesky factor matrix R is approximately block Toeplitz for N>>v. See J. Rissanen, "Algorithms for Triangular Decomposition of Block Hankel and Toeplitz Matrices with Application to Factoring Positive Matrix Polynomials," *Math. Computations*, vol. 27, pp. 147-154, January 1973. (Rissanen et al.) Thus, only the first few block columns of matrix R are computed and then the last block is copied to get matrix R. In practice, computing at least v block columns leads to small approximation errors, as included in References Vollmer et al. II and Beretta et al. The algorithm as applied to TD-SCDMA uplink is described in detail in Reference Vollmer et al. II.

Complexity of Block Fourier Algorithm

The solution for equation (2) is simplified further if the matrix is circulant. The eigen vectors of circulant matrices are the columns of Discrete Fourier Transform (DFT) matrix. Thus, systems of equations can be solved via a diagonalization using the Fourier Transform. In Beretta et al., a frequency domain approach was suggested for performing joint detection. The block Toeplitz matrix T is made block circulant (and thus square) by padding it with rows and columns. This approach to joint detection requires multiple DFTs, reciprocal and square-root operations. As NK increases, the complexity can be managed by applying the FFT to smaller overlapping blocks of data. As long as the block size is greater than N+v−1, this approximation leads to acceptable error. Small block sizes also lead to larger implementation overheads, while larger block sizes lead to greater computational complexity. It was shown in Vollmer et al. I, that the block Fourier approach requires fewer real multiplications than either the approximate Cholesky or block Schur techniques.

Software-Defined Radio Implementation

The increasing need for the support of multiple wireless standards and eternally evolving standards has led to the adoption of software-defined radios in mobile terminals. Further, DSPs are increasingly powerful providing billions of operations per second and with power efficiency levels that are appropriate for handset deployment.

Sandbridge Technologies has designed a multi-threaded processor capable of executing DSP, Control, and Java code in a single compound instruction set optimized for handset radio applications. The Sandbridge design overcomes the deficiencies of previous approaches by providing substantial parallelism and throughput for high-performance DSP applications while maintaining fast interrupt response, high-level language programmability, and very low power dissipation.

Figure 11:
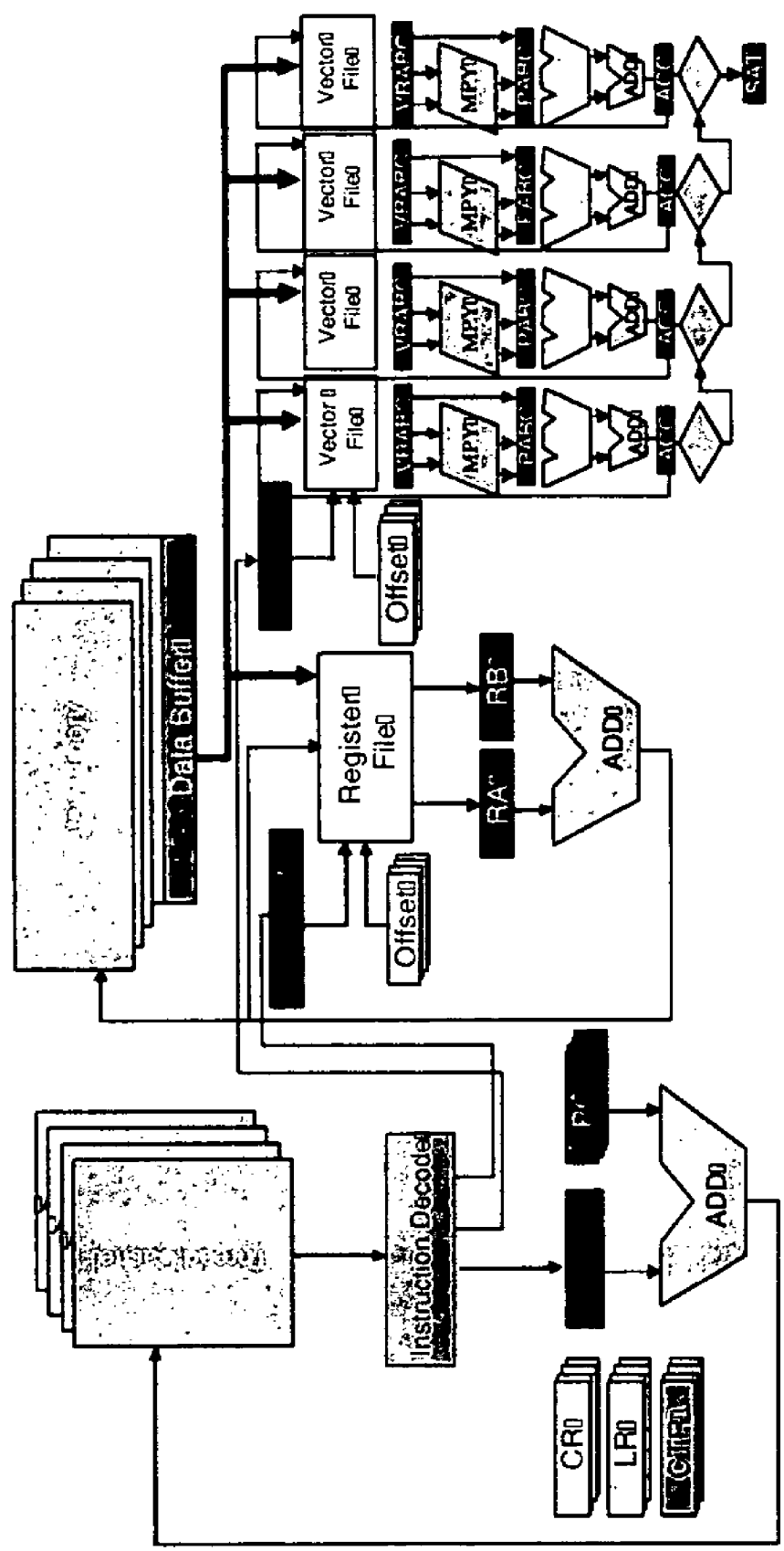
FIG. 11 shows the SandBlaster® Multithreaded Processor.
Figure 12:
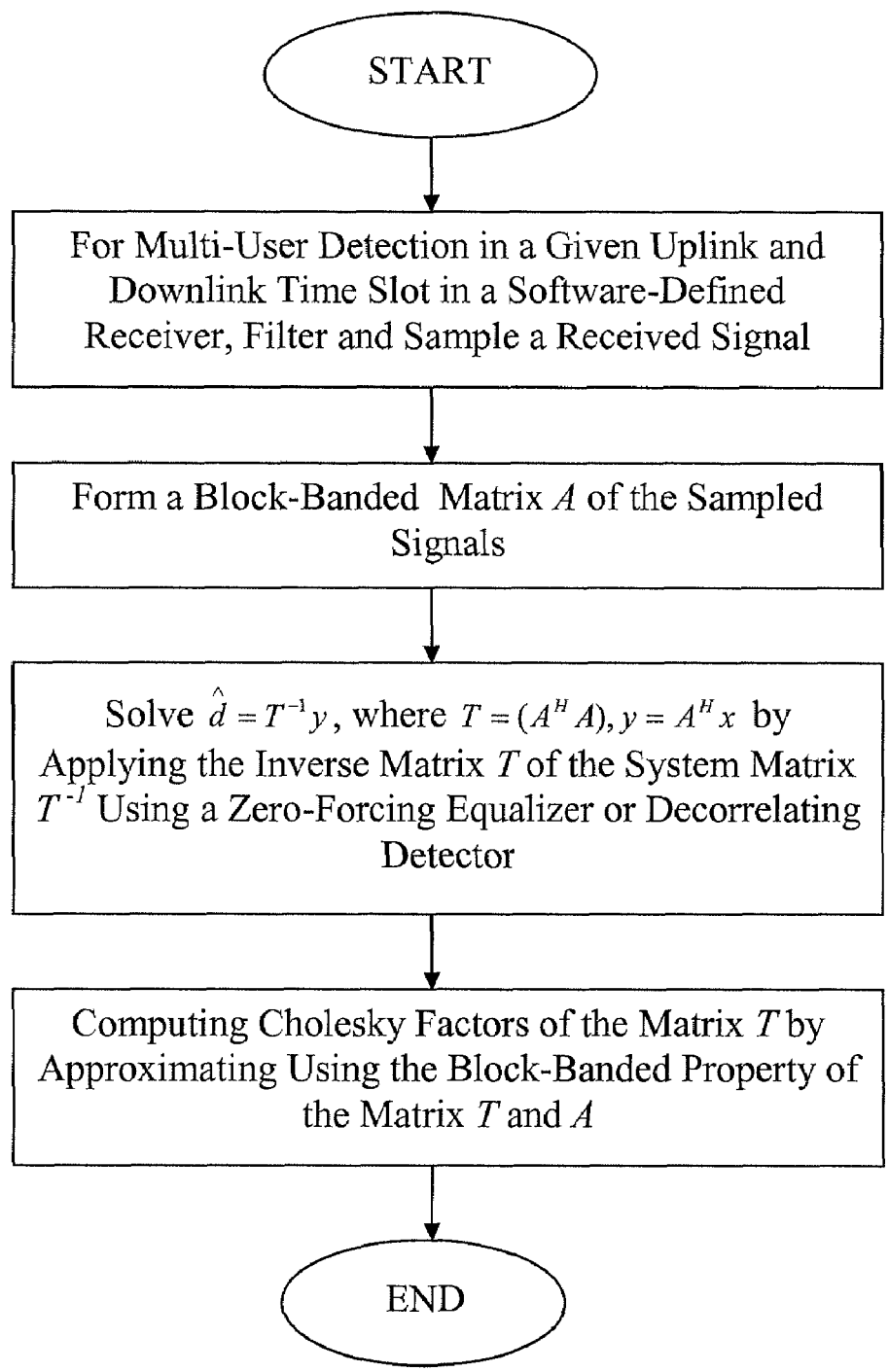
FIG. 12 is a flow diagram illustrating a first method contemplated by the present invention.
Figure 13:
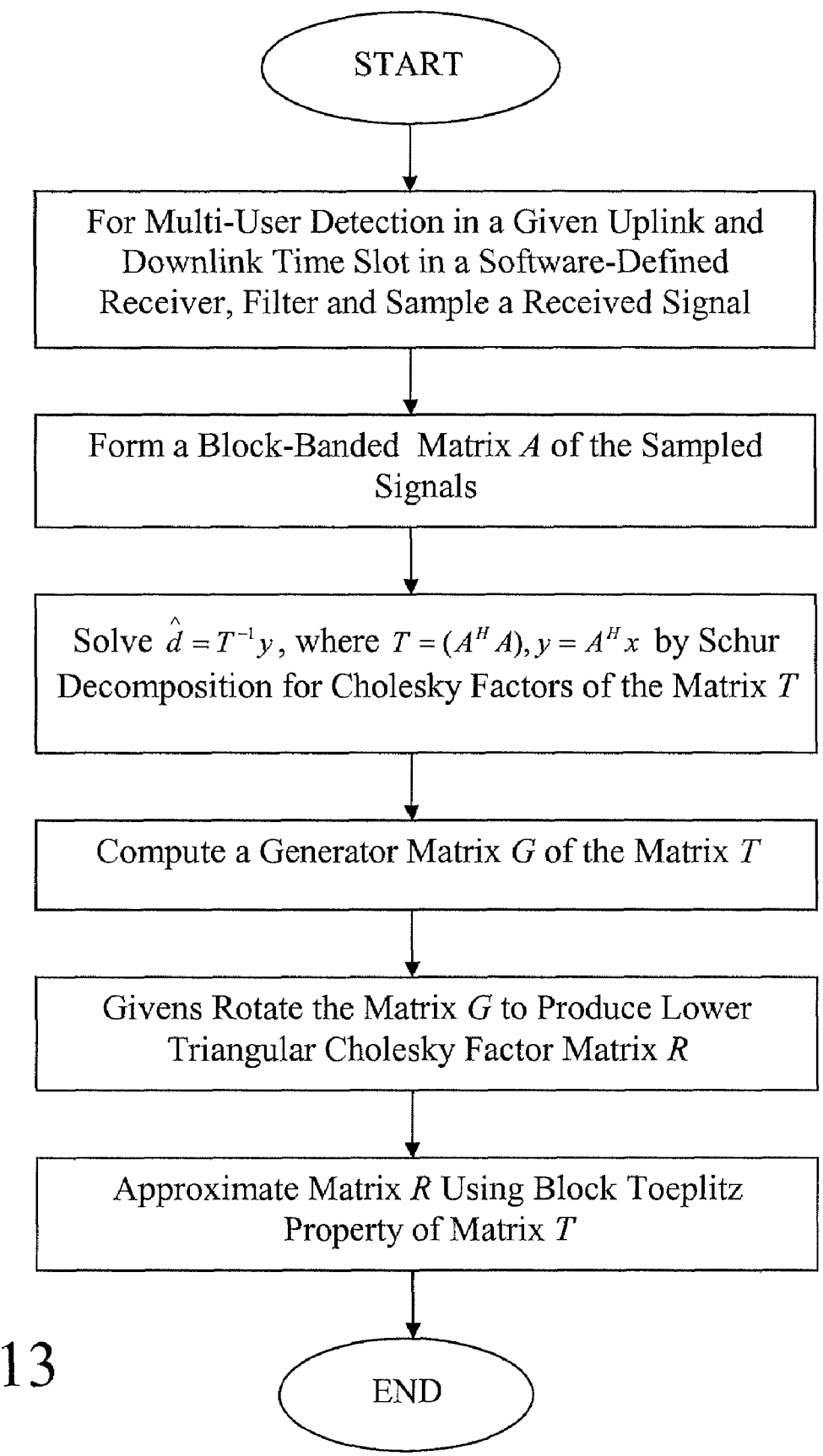
FIG. 13 is a flow diagram illustrating a second method contemplated by the present invention.
Figure 14:
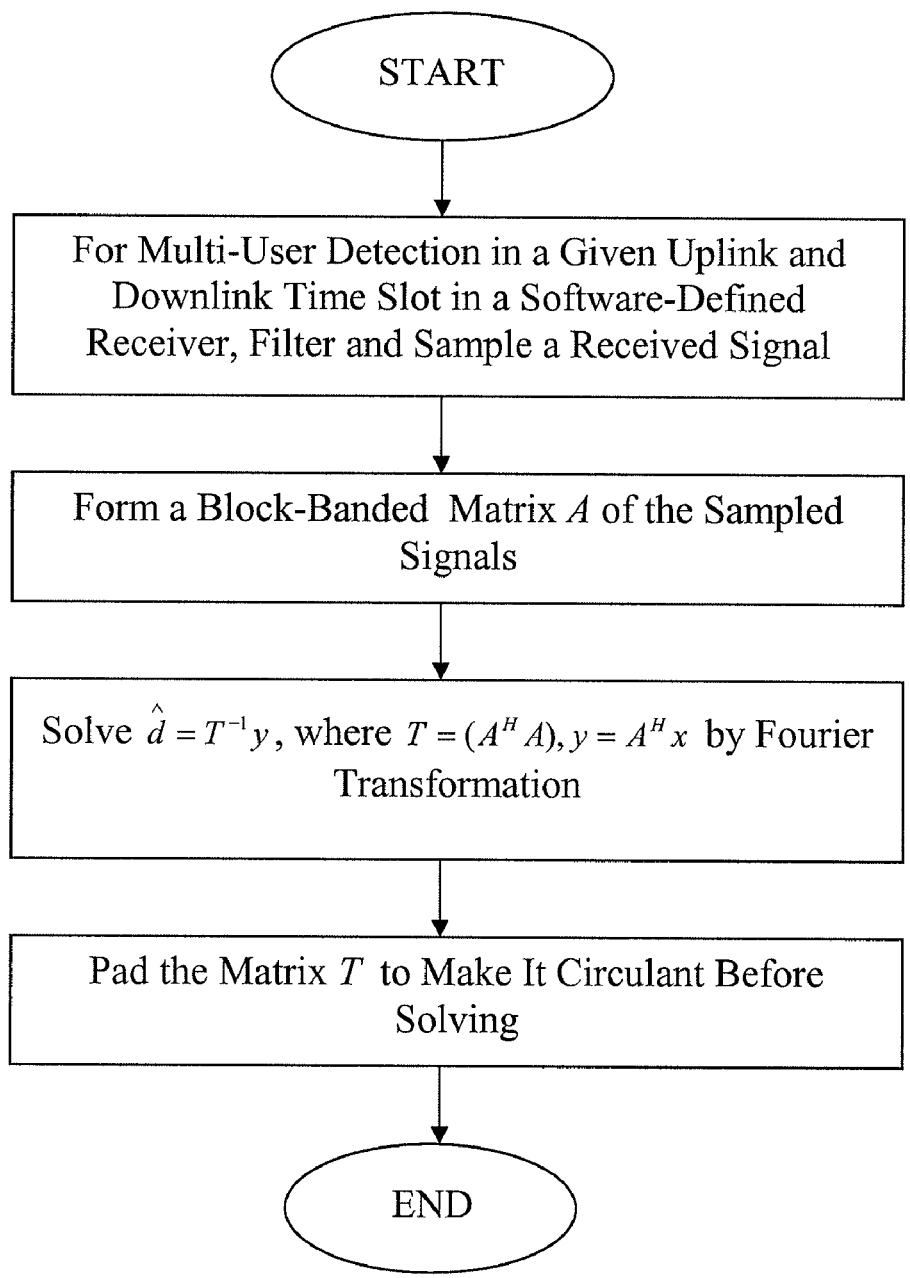
FIG. 14 is a flow diagram illustrating a third method contemplated by the present invention.

As shown in FIG. 11, the design includes a unique combination of modern techniques such as a SIMD Vector/DSP unit, a parallel reduction unit, and RISC-based integer unit. Instruction space is conserved through the use of compounded instructions that are grouped into packets for execution. The resulting combination provides for efficient Control Code, DSP, and Java processing execution.

The SandBlaster® platform consists of the fixed-point Sandblaster multi-threaded DSP processor, which does the base band processing. The software tool chain is primarily dedicated towards generating and simulating efficient code for this processor. The Sandbridge compiler analyzes the C code, automatically extracts the DSP operations and synthesizes optimized DSP code without the excess operations required to specify DSP arithmetic in C code. This technique has a significant software productivity gain over intrinsic functions.

The Sandbridge vectorizing compiler is efficient at extracting this parallelism using Vectorizing optimizations. The Sandbridge compiler also handles the difficult problem of outer loop vectorization which is often a requirement for inner loop optimizations.

FIGS. 3-11 compare the estimated processing power required for a software implementation of the joint detector on the SandBlaster® platform. In all cases, the block size for Fourier algorithm is constant at 32.

The Fourier based approach required the least number of multiplications. However, as is evident from the results here, the gains in a practical implementation are smaller (or even non-existent) because the computations are not easily parallelized. Additionally, the number of reciprocal and square-root operations in the block Fourier method are more than twice those required for either the approximate Cholesky or Schur. Typically, these operations consume many more cycles in a typical processor.

Note that the complexity of the approximate Cholesky and Schur methods depends on the number of rows $a_r$ that are computed (the rest are just copies of the last block row). The approximation error is small as long as $a_r$>v. Thus, the complexity goes up with the delay spread. For example, in FIG. 10 with $a_r$=6, the Schur and Fourier are comparable in complexity. But if $a_r$=4, the complexity of the Schur algorithm drops ($a_r$ is not relevant to the Fourier method). The Cholesky and Schur decompositions require $O(v^2NK^3)$ and $O(vNK^3)$, respectively. However, the constants involved in the Schur are much larger than those in Cholesky. Therefore, unless v is large, the complexity of the two algorithms is comparable. However, the orthogonal operations used in the Schur algorithm are less susceptible to numerical errors than are the row operations used in the Cholesky decomposition, as indicated by G. Golub and I. Mitchell, "Matrix Factorizations in Fixed Point on the C6x VLIW Architecture," TI report, 1998, http://sccm.stanford.edu/students/mitchell/reportTI.ps. (Golub et al. II) For longer channel delay spread, depending on the given scenario, the block Fourier may be preferred over the block Schur. For example, for longer channel delay spreads, the Fourier method, since it is a frequency domain approach offers lower complexity. While support of multiple algorithms is expensive to implement in hardware, it is certainly feasible in a software platform such as the SandBlaster® platform.

Although the present disclosure has been described and illustrated in detail, it is to be clearly understood that this is done by way of illustration and example only and is not to be taken by way of limitation.

What is claimed:

1. A method of multi-user detection in a given uplink and downlink time slot in a software-defined wireless receiver, the method comprising:

receiving a received signal by at least one antenna in the wireless receiver;

filtering and sampling the received signal to create sampled signals;

forming a block-banded matrix A of the sampled signals;

via a multi-threaded processor, solving $d=T^{-1}y$, where $T=(A^H A)$, $y=A^H x$ by selecting between and applying at least one computational approach comprising (1) applying the inverse matrix T of the system matrix $T^{-1}$ using a zero-forcing equalizer or decorrelating detector and computing Cholesky factors of the matrix T by approximating using the block-banded property of the matrix T and A, wherein at least the solving and the computing are performed via the multi-threaded processor;

(2) applying Schur decomposition for Cholesky factors of the matrix T, computing a generator matrix G of the matrix T, Givens rotating the matrix G to produce lower triangular Cholesky factor matrix R, and approximating matrix R using block Toeplitz property of matrix T, wherein at least the solving and the computing are performed via the multi-threaded processor;

(3) applying Fourier Transformation and padding the matrix T to make it circulant before solving, wherein at least the solving and the padding are performed via the multi-threaded processor;

wherein the multi-threaded processor is connected to the at least one antenna in the wireless receiver and comprises a single instruction multiple data (SIMD) Vector/digital signal processor (DSP) unit, a parallel reduction unit, and a reduced instruction set computer (RISC)-based integer unit.

2. The method of claim 1, wherein, when applying the Schur decomposition approach, only first couple of block columns of the matrix R are computed and the last block is copied.

* * * * *